(12) United States Patent
Jeon et al.

(10) Patent No.: US 8,482,665 B2
(45) Date of Patent: Jul. 9, 2013

(54) CAMERA MODULE

(75) Inventors: Hae Jin Jeon, Gyunggi-do (KR); Joo Young Ha, Gyunggi-do (KR); In Taek Song, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 0 days.

(21) Appl. No.: 13/270,535

(22) Filed: Oct. 11, 2011

(65) Prior Publication Data

US 2013/0027607 A1    Jan. 31, 2013

(30) Foreign Application Priority Data

Jul. 28, 2011 (KR) .......................... 10-2011-0075371

(51) Int. Cl.
*H04N 5/225* (2006.01)
*H04N 7/18* (2006.01)

(52) U.S. Cl.
USPC .......................................... 348/374; 348/149

(58) Field of Classification Search
USPC ................... 348/373–376, 340, 149
See application file for complete search history.

(56) References Cited

U.S. PATENT DOCUMENTS

2006/0171704 A1 * 8/2006 Bingle et al. .................. 396/419
2011/0053398 A1 * 3/2011 Arai et al. ..................... 439/271

* cited by examiner

*Primary Examiner* — Tuan Ho
*Assistant Examiner* — Shahbaz Nazrul
(74) *Attorney, Agent, or Firm* — Ladas & Parry LLP

(57) ABSTRACT

Disclosed herein is a camera module including: an image sensor which converts an image entering through a lens into an electric signal; a rigid-flexible substrate which includes first and second rigid substrates distanced from each other and a flexible substrate to connect the first and the second rigid substrates to each other; a first connection part which is electrically connected to the rigid-flexible substrate; and a second connection part which has one end electrically connected to the first connection part and the other end connected to a cable, and which is disconnectable from the first connection part and the cable.

18 Claims, 2 Drawing Sheets

CAMERA MODULE

CROSS REFERENCE TO RELATED APPLICATION

This application claims the benefit of Korean Patent Application No. 10-2011-0075371, filed on Jul. 28, 2011, entitled "Camera Module" which is hereby incorporated by reference in its entirety into this application.

BACKGROUND OF THE INVENTION

1. Technical Field

The present invention relates to a camera module.

2. Description of the Related Art

A recent trend in the automobile market is leaning toward safety and convenience. Accordingly, by applying a variety of sensors to the automobile, safety and convenience are provided for drivers.

A camera may be applied to the automobile to provide the driver with environment information around the automobile and thus can improve convenience.

Accordingly, a camera configured to have a small size has been demanded for the sake of convenience when being mounted in the automobile.

However, since the camera should essentially mount many parts therein in order to recognize a photographed image, it is difficult to miniaturize the camera.

SUMMARY OF THE INVENTION

The present invention has been made in an effort to provide a camera module which can assist in enlarging a part mounting space in a camera.

The present invention has also been made in an effort to provide a camera module which can employ cables in various forms according to manufacturers without changing a configuration of a camera.

According to a preferred embodiment of the present invention, there is provided a camera module including: an image sensor which converts an image entering through a lens into an electric signal; a rigid-flexible substrate which includes first and second rigid substrates disposed with a gap therebetween and a flexible substrate to connect the first and the second rigid substrates to each other; a first connection part which is electrically connected to the rigid-flexible substrate; and a second connection part which has one end electrically connected to the first connection part and the other end connected to a cable, and which is disconnectable from the first connection part and the cable.

The image sensor may be mounted on the first rigid substrate and may be electrically connected to the first rigid substrate.

The first connection part may be connected to the second rigid substrate.

The camera module may further include: a front case in which the image sensor and the first rigid substrate are mounted; and a rear case which has one end connected to the front case and the other end connected to the cable, and includes a mounting recess formed on an area corresponding to an area where the second rigid substrate and the first connection part are to be placed, and a fastening hole formed in the shape of a penetrating hole to which a part of the second connection part is fastened, the fastening hole being formed by extending from a part of the mounting recess, wherein the second rigid substrate may be disposed under the first rigid substrate.

The second connection part may include a first fixing protrusion to be fixed to the rear case, and the fastening hole may include a first fixing recess formed on an area corresponding to the first fixing protrusion to be fastened to the second connection part.

The camera module may further include a first fixing means which penetrates through one side of the second rigid substrate to be inserted into the rear case so as to fix the second rigid substrate and the rear case.

The rear case may further include a fastening bar having a recess into which the first fixing means is inserted.

The second connection part may have one end fastened to the rear case and the other end fastened to the cable.

The second connection part may further include a waterproofing ring which encloses an area of the second connection part to be fastened to the cable, except for an area inserted into the rear case.

The camera module may further include the cable which includes a fastening recess formed at one end to be fastened to the second connection part, and which is fastened to the second connection part and is electrically connected to the second connection part.

The second connection part may further include a second fixing protrusion formed at the other end of the second connection part to be fixed to the cable, and the cable may further include a second fixing recess formed on an area corresponding to the second fixing protrusion to be fastened to the second fixing protrusion.

Thicknesses of the first and the second rigid substrates may be thicker than a thickness of the flexible substrate.

DESCRIPTION OF THE PREFERRED EMBODIMENTS

Figure 1:
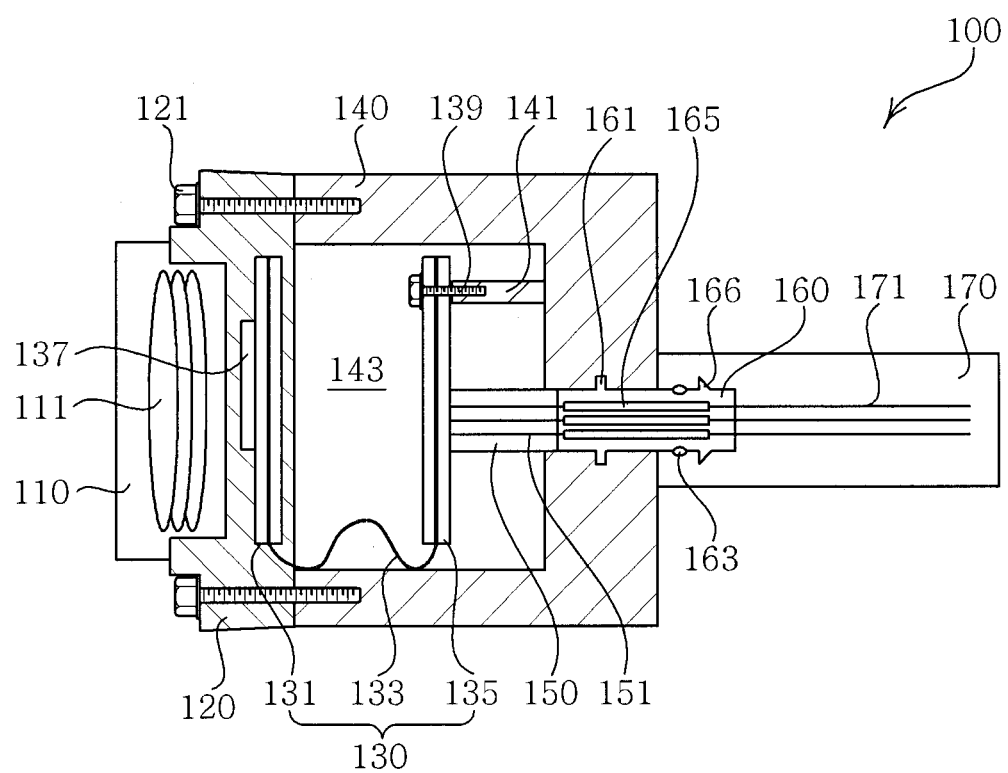
FIG. 1 is a view illustrating a configuration of a camera module according to a preferred embodiment of the present invention.

Various features and advantages of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. In the description, the terms "first", "second", and so on are used to distinguish one element from another element, and the elements are not defined by the above terms.

Hereinafter, preferred embodiments of the present invention will be described in greater detail with reference to the accompanying drawings.

Camera Module

Figure 2:
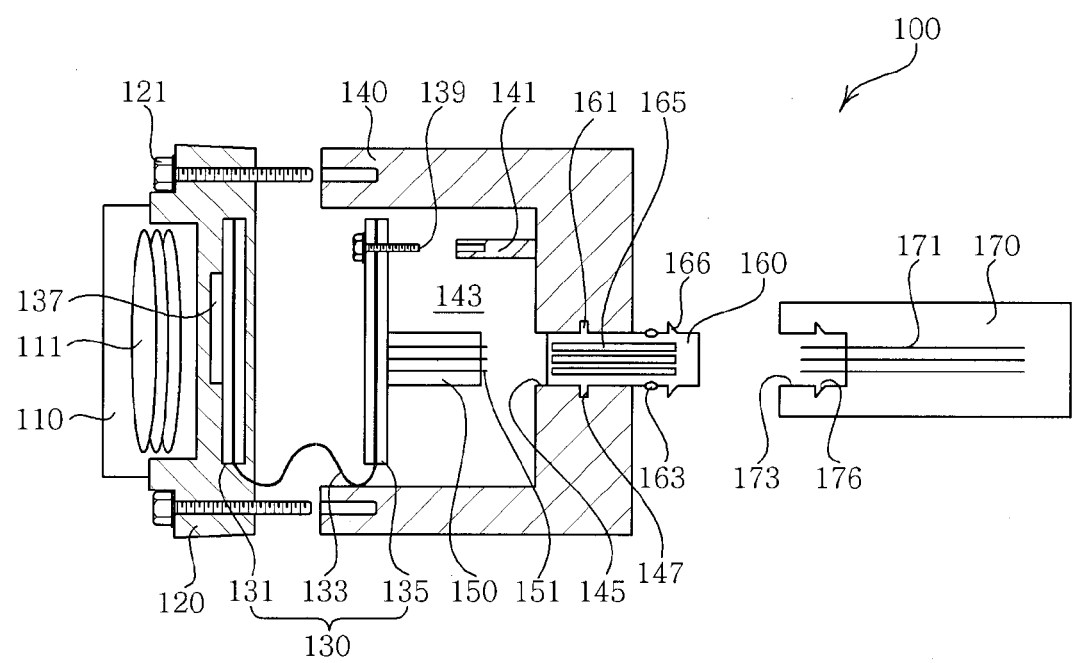
FIG. 2 is an exploded view illustrating the camera module in more detail according to the preferred embodiment of the present invention.
Figure 3:
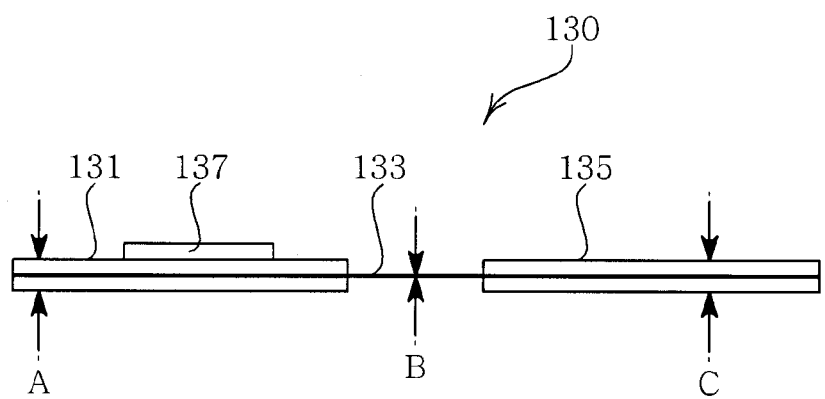
FIG. 3 is a view illustrating a rigid-flexible substrate of the present invention in detail.

FIG. 1 is a view illustrating a camera module according to a preferred embodiment of the present invention, FIG. 2 is an exploded view illustrating the camera module in more detail according to the preferred embodiment of the present invention, and FIG. 3 is a view illustrating a rigid-flexible substrate of the present invention in detail.

As shown in the drawings, a camera module 100 includes: an image sensor 137 which converts an image entering through a lens 111 into an electric signal; a rigid-flexible substrate 130 which includes first and second rigid substrates 131 and 135 disposed with a gap therebetween and a flexible substrate 133 to connect the first and the second rigid substrates 131 and 135 to each other; a first connection part 150 which is electrically connected to the rigid-flexible substrate 130; and a second connection part 160 which has one end electrically connected to the first connection part 150 and the other end electrically connected to a cable 170 and which is disconnectable from the first connection part 150 and the cable 170.

Since the second connection part 160 is configured such that it can be disconnected from the cable 170, it is possible to respond to a case in which cables of different specifications are applied.

More specifically, since the second connection part 160 and the cable 170 are integrally formed with each other in the related art, there is a problem in that all of the parts and cases in the camera module 100 to be connected to the cable 170 should be changed, if the cable 170 is changed.

However, according to the preferred embodiment of the present invention, since the camera module 100 applies the second connection part 160 separately from the cable 170, the parts of the camera module 100, including the second connection part 160, need not be replaced, even if the specification of the cable 170 is changed.

Also, the image sensor 137 may be mounted on the first rigid substrate 131 and electrically connected to the first rigid substrate 131.

The image sensor 137 is an element that converts an optical image into an electric signal and a charge coupled device and a complementary metal-oxide semiconductor (CMOS) are widely used as the image sensor 137.

The first connection part 150 may also be connected to the second rigid substrate 135.

The first connection part 150 may include a terminal 151 formed therein to be electrically connected to the second rigid substrate 135 and the second connection part 160.

Since the first connection part 150 is configured such that its one end is connected to the second rigid substrate 135 and simultaneously the other end is directly connected to the second connection part 160, a separate linear terminal to electrically connect the rigid-flexible substrate 130 and the second connection part 160 is not needed. Therefore, connection configurations among the parts in the camera module 100 can be simplified and also a product mounting space for other parts can be enlarged.

As shown in FIG. 1, the second rigid substrate 135 may be disposed under the first rigid substrate 131.

Also, as shown in FIG. 2, the camera module 100 may include a front case 120 in which the image sensor 137 and the first rigid substrate 131 are mounted, and a rear case 140 which has one end connected to the front case 120 and the other end connected to the cable 170, and which includes a mounting recess 143 formed on an area corresponding to an area in which the second rigid substrate 135 and the first connection part 150 are to be placed, and a fastening hole 145 formed in the shape of a penetrating hole to allow a part of the second connection part 160 to be inserted thereinto.

As shown in FIGS. 1 and 2, the fastening hole 145 may be formed by extending from a part of the mounting recess 143.

That is, the mounting recess 143 is formed, starting from one end at which the rear case 140 and the front case 120 are connected to each other, and has a part penetrating along with the fastening hole 145 formed on the other end of the rear case 140.

The second connection part 160 may include a first fixing protrusion 161 to be fixed to the rear case 140.

The fastening hole 145 may include a first fixing recess 147 formed on an area corresponding to the first fixing protrusion 161 to be fastened to the second connection part 160.

Also, the camera module 100 may further include a first fixing means 139 penetrating through one side of the second rigid substrate 135 and inserted into the rear case 140 to fix the second rigid substrate 135 to the rear case 140.

The rear case 140 may further include a fastening bar 141 having a recess into which the first fixing means 139 is inserted.

The fastening bar 141 may be formed on an area where the first fixing means 139 is to be placed.

Since the second rigid substrate 135 and the rear case 140 are fixed to each other by means of the first fixing means 139 and the fastening bar 141, the second rigid substrate 135 and the parts connected to the second rigid substrate 135 are not disconnected, even if shock such as oscillation is applied to the camera module 100, and accordingly, durability of the camera module 100 can be improved.

One end of the second connection part 160 may be fastened to the rear case 140 and the other end may be fastened to the cable 170.

As shown in FIG. 1, one end of the second connection part 160 is inserted into and mounted on the rear case 140 and an area of the second connection part 160 except for the area mounted in the rear case 140 protrudes from a lower surface of the rear case 140 and is mounted on the cable 170.

The second connection part 160 and the cable 170 may include terminals 165 and 171, respectively, to be electrically connected to each other.

Also, the second connection part 160 may further include a waterproofing ring 163 enclosing the area of the second connection part 160 to be connected to the cable 170, except for the area inserted into the rear case 140.

The waterproofing ring 163 may be made of elastic material so that it is deformable and the second connection part 160 can be fastened to the cable 170 with the waterproofing ring 163 being mounted thereon.

The waterproofing ring 163 serves to prevent water from passing through a connection portion where the second connection part 160 and the cable 170 are connected to each other, after the connection. Accordingly, there is an effect that liquid including water is prevented from entering the camera module 100 from an external source.

Also, as shown in FIG. 2, the camera module 100 may further include the cable 170 which includes a fastening recess 173 formed at one end of the cable 170 to be fastened to the second connection part 160, and is fastened and electrically connected to the second connection part 160.

Also, the second connection part 160 may further include a second fixing protrusion 166 formed at the other end of the second connection part 160 to be fixed to the cable 170.

The cable 170 may further include a second fixing recess 176 formed on an area corresponding to the second fixing protrusion 166 to be fastened to the second fixing protrusion 166.

As shown in FIG. 3, the first and the second rigid substrates 131 and 135 may be formed with thicknesses thicker than that of the flexible substrate 133.

More specifically, since a general camera module places connectors among a plurality of substrates to electrically connect the plurality of substrates, there is a problem in that a space for mounting the substrates and the connectors among the substrates should be guaranteed.

However, since the rigid-flexible substrate 130 according to the preferred embodiment of the present invention applies the flexible substrate to connect the rigid substrates, a space for mounting the substrates can be reduced and thus a mounting area for other parts can be enlarged. Thus, the number of necessary parts can also be decreased.

Also, since a connector (not shown) for electrically connecting the substrates is not used, a problem of electromagnetic waves generated from the connector can be solved.

Also, the relationship among the thickness (A) of the first rigid substrate 131, the thickness (B) of the flexible substrate 133, and the thickness (C) of the second rigid substrate 135 may be $A \geqq C > B$ or $C \geqq A > B$.

The above-described rigid flexible substrate can be applied to a case in which substrates with various thicknesses are mounted in the camera module 100.

In addition, the rigid-flexible substrate 130 according to the preferred embodiment can minimize a gap between the substrate and the rear case 140 and accordingly can reduce the size of the camera module 100.

Meanwhile, as shown in FIG. 1, the lens 111 is mounted on a lens assembly 110 and thus is mounted in the front case 120.

In addition, the camera module 100 may further include a second fixing means 121 penetrating through both sides of the front case 120 and inserted into the rear case 140.

Since the second fixing means 121 serves to fixedly secure the front case 120 and the rear case 140, the durability of the camera module 100 can be improved.

Since the camera module of the present invention applies the rigid-flexible substrate, a space necessary for mounting the substrate in the camera can be reduced and accordingly a mounting space for other parts can be enlarged.

In addition, since the connection parts are formed at a linear case end of the camera to be able to replace the cable, various cables of different manufacturers can be employed without changing a configuration of the camera.

Although the embodiments of the present invention have been disclosed for illustrative purposes, the camera module of the present invention is not limited to the embodiments and those skilled in the art will appreciate that various modifications, additions, and substitutions are possible, without departing from the scope and spirit of the invention as disclosed in the accompanying claims.

Accordingly, such modifications, additions and substitutions should also be understood to fall within the scope of the present invention.

What is claimed is:

1. A camera module comprising:
    an image sensor which converts an image entering through a lens into an electric signal;
    a rigid-flexible substrate which includes first and second rigid substrates disposed with a gap therebetween and a flexible substrate to connect the first and the second rigid substrates to each other;
    a first connection part which is electrically connected to the rigid-flexible substrate;
    a second connection part which has one end electrically connected to the first connection part and the other end connected to a cable, and which is disconnectable from the first connection part and the cable;
    a front case;
    a rear case which has one end connected to the front case, and comprises a fastening bar having a recess; and
    a first fixing means which penetrates through one side of the second rigid substrate to be inserted into the recess of the fastening bar so as to fix the second rigid substrate and the rear case.

2. The camera module as set forth in claim 1, wherein the image sensor is mounted on the first rigid substrate and is electrically connected to the first rigid substrate.

3. The camera module as set forth in claim 1, wherein the first connection part is connected to the second rigid substrate.

4. The camera module as set forth in claim 1, wherein
    the front case mounts the image sensor and the first rigid substrate,
    the rear case has the other end connected to the cable, and includes a mounting recess formed on an area corresponding to an area where the second rigid substrate and the first connection part are to be placed, and a fastening hole formed in the shape of a penetrating hole to which a part of the second connection part is fastened, the fastening hole being formed by extending from a part of the mounting recess,
    wherein the second rigid substrate is disposed under the first rigid substrate.

5. The camera module as set forth in claim 4, wherein the second connection part includes a first fixing protrusion to be fixed to the rear case, and
    the fastening hole includes a first fixing recess formed on an area corresponding to the first fixing protrusion to be fastened to the second connection part.

6. The camera module as set forth in claim 4, wherein the second connection part has one end fastened to the rear case and the other end fastened to the cable.

7. The camera module as set forth in claim 4, wherein the second connection part further includes a waterproofing ring which encloses an area of the second connection part to be fastened to the cable, except for an area inserted into the rear case.

8. The camera module as set forth in claim 1, further comprising the cable which includes a fastening recess formed at one end to be fastened to the second connection part, and which is fastened to the second connection part and is electrically connected to the second connection part.

9. The camera module as set forth in claim 8, wherein the second connection part further includes a second fixing protrusion formed at the other end of the second connection part to be fixed to the cable, and
    the cable further includes a second fixing recess formed on an area corresponding to the second fixing protrusion to be fastened to the second fixing protrusion.

10. The camera module as set forth in claim 1, wherein thicknesses of the first and the second rigid substrates are thicker than a thickness of the flexible substrate.

11. A camera module comprising:
    an image sensor which converts an image entering through a lens into an electric signal;
    a rigid-flexible substrate which includes first and second rigid substrates disposed with a gap therebetween and a flexible substrate to connect the first and the second rigid substrates to each other, wherein the second rigid substrate being disposed under the first rigid substrate;

a first connection part which is electrically connected to the rigid-flexible substrate;

a second connection part which has one end electrically connected to the first connection part and the other end connected to a cable, and which is disconnectable from the first connection part and the cable;

a front case in which the image sensor and the first rigid substrate are mounted;

a rear case which has one end connected to the front case and the other end connected to the cable, and includes a mounting recess formed on an area corresponding to an area where the second rigid substrate and the first connection part are to be placed, and a fastening hole formed in the shape of a penetrating hole to which a part of the second connection part is fastened, the fastening hole being formed by extending from a part of the mounting recess; and a first fixing means which penetrates through one side of the second rigid substrate to be inserted into the rear case so as to fix the second rigid substrate and the rear case, wherein the second connection part includes a first fixing protrusion radially protruding from a surface thereof to be fixed to the rear case, the fastening hole includes a first fixing recess formed on an area corresponding to the first fixing protrusion to be fastened to the second connection part, and the rear case further includes a fastening bar having a recess into which the first fixing means is inserted.

12. The camera module as set forth in claim 11, wherein the image sensor is mounted on the first rigid substrate and is electrically connected to the first rigid substrate.

13. The camera module as set forth in claim 11, wherein the first connection part is connected to the second rigid substrate.

14. The camera module as set forth in claim 11, wherein the second connection part has one end fastened to the rear case and the other end fastened to the cable.

15. The camera module as set forth in claim 11, wherein the second connection part further includes a waterproofing ring which encloses an area of the second connection part to be fastened to the cable, except for an area inserted into the rear case.

16. The camera module as set forth in claim 11, further comprising the cable which includes a fastening recess formed at one end to be fastened to the second connection part, and which is fastened to the second connection part and is electrically connected to the second connection part.

17. The camera module as set forth in claim 16, wherein the second connection part further includes a second fixing protrusion formed at the other end of the second connection part to be fixed to the cable, and the cable further includes a second fixing recess formed on an area corresponding to the second fixing protrusion to be fastened to the second fixing protrusion.

18. The camera module as set forth in claim 11, wherein thicknesses of the first and the second rigid substrates are thicker than a thickness of the flexible substrate.

* * * * *